United States Patent
Ankel et al.

(10) Patent No.: US 10,028,183 B2
(45) Date of Patent: Jul. 17, 2018

(54) METHODS AND NETWORK NODES IN A WIRELESS COMMUNICATION NETWORK FOR HANDLING OF UPLINK SIGNALS SENT BY A USER EQUIPMENT

(71) Applicant: Telefonaktiebolaget LM Ericsson (publ), Stockholm (SE)

(72) Inventors: Pär Ankel, Nödinge (SE); Henrik Egnell, Uppsala (SE); Billy Hogan, Sollentuna (SE); Anders Lamm, Mölndal (SE); Erik Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/504,315

(22) PCT Filed: Oct. 3, 2014

(86) PCT No.: PCT/EP2014/071235
§ 371 (c)(1),
(2) Date: Feb. 15, 2017

(87) PCT Pub. No.: WO2016/050318
PCT Pub. Date: Apr. 7, 2016

(65) Prior Publication Data
US 2017/0245183 A1    Aug. 24, 2017

(51) Int. Cl.
*H04W 36/00* (2009.01)
*H04W 36/18* (2009.01)
(Continued)

(52) U.S. Cl.
CPC ....... *H04W 36/0083* (2013.01); *H04W 36/18* (2013.01); *H04W 36/20* (2013.01); *H04W 72/0413* (2013.01)

(58) Field of Classification Search
CPC . H04W 36/0083; H04W 36/18; H04W 36/20; H04W 72/0413; H04W 36/00;
(Continued)

(56) References Cited

U.S. PATENT DOCUMENTS

| 6,553,016 B1 * | 4/2003 | Roxbergh | H04W 52/40 370/331 |
| 8,644,835 B2 * | 2/2014 | Choi | H04W 36/04 455/444 |

(Continued)

FOREIGN PATENT DOCUMENTS

| WO | 2007133132 A1 | 11/2007 |
| WO | 2011099907 A1 | 8/2011 |

OTHER PUBLICATIONS

International Search Report and Written Opinion for PCT Application No. PCT/EP2014/071235, dated Jul. 1, 2015, 9 pages.

(Continued)

*Primary Examiner* — Meless Zewdu
(74) *Attorney, Agent, or Firm* — NDWE LLP

(57) ABSTRACT

A method performed by a first network node of a wireless communication network for handling uplink signals sent by a UE. The wireless communication network comprises a serving network node responsible for transmitting downlink signals to the UE, and a non-serving network node capable of receiving uplink signals sent by the UE. The non-serving network node is the first network node and the serving network node is a second network node of the communication network, or vice versa. The method comprises receiving an uplink signal from the UE, measuring signal quality on the received uplink signal, and receiving signal quality information from the second network node regarding signal quality measured by the second network node on the uplink signal received by the second network node, to detect (Continued)

imbalances in experienced signal quality between the first network node and the second network node.

20 Claims, 5 Drawing Sheets

(51) Int. Cl.
*H04W 36/20* (2009.01)
*H04W 72/04* (2009.01)

(58) Field of Classification Search
CPC ..... H04W 72/04; H04W 52/14; H04W 28/08; H04W 24/02; H04W 24/08; H04W 16/08; H04W 52/244; H04W 52/325; H04W 4/02; H04W 28/0236; H04W 52/40; H04W 48/12; H04W 76/046; H04W 36/30; H04W 36/0088; H04W 36/0094; H04W 36/0061; H04W 36/0077; H04W 52/24; H04W 52/241; H04W 72/082; H04W 72/085; Y02B 60/50; H04B 17/27; H04B 17/327; H04B 1/7103; H04B 17/309; H04B 17/336

See application file for complete search history.

(56) References Cited

U.S. PATENT DOCUMENTS

| | | | | |
|---|---|---|---|---|
| 8,792,942 B2* | 7/2014 | Oyama | ................ | H04W 16/28 455/562.1 |
| 8,903,394 B2* | 12/2014 | Shen | ..................... | H04B 7/155 455/436 |
| 2003/0039217 A1* | 2/2003 | Seo | ..................... | H04W 52/16 370/318 |
| 2003/0210668 A1 | 11/2003 | Malladi et al. | | |
| 2008/0200202 A1* | 8/2008 | Montojo | ............... | H04W 52/06 455/522 |
| 2010/0087221 A1* | 4/2010 | Srinivasan | ............ | H04W 16/08 455/522 |
| 2010/0323749 A1* | 12/2010 | Lee | ..................... | H04W 36/28 455/524 |
| 2011/0275361 A1* | 11/2011 | Yavuz | ................ | H04W 52/143 455/422.1 |
| 2011/0312319 A1* | 12/2011 | Lindoff | ............... | H04W 72/042 455/450 |
| 2012/0014274 A1* | 1/2012 | Muraoka | ........... | H04W 52/0206 370/252 |
| 2014/0135019 A1* | 5/2014 | Jang | .................... | H04W 76/043 455/437 |
| 2014/0179363 A1* | 6/2014 | Nishikawa | .......... | H04L 27/2614 455/522 |
| 2015/0289212 A1* | 10/2015 | Januszewski | ....... | H04W 52/243 370/329 |

OTHER PUBLICATIONS

"3rd Generation Partnership Project; Technical Specification Group Radio Access Network; Study on UMTS heterogeneous networks (Release 12)," Dec. 2013, 165 pages, 3GPP TR 25.800, V12.1.0, 3GPP Organizational Partners.

"UMTS Mobility enhancements for Heterogeneous Networks—Core," Sep. 3-6, 2013, 5 pages, 3GPP TSG RAN Meeting #61, RP-131348, Huawei, HiSilicon, Porto, Portugal.

"UMTS Mobility enhancements for Heterogeneous Networks—Feature," Sep. 3-6, 2013, 4 pages, 3GPP TSG RAN Meeting #61, RP-131348, Huawei, HiSilicon, Porto, Portugal.

"UMTS Mobility enhancements for Heterogeneous Networks—Performance," Sep. 3-6, 2013, 4 pages, 3GPP TSG RAN Meeting #61, RP-131348, Huawei, HiSilicon, Porto, Portugal.

"UMTS Heterogeneous Networks enhancements—Core," Dec. 3-6, 2013, 6 pages, 3GPP TSG RAN Meeting 062, RP-132074, Huawei, HiSilicon, Busan, South Korea.

"UMTS Heterogeneous Networks enhancements—Feature," Dec. 3-6, 2013, 5 pages, 3GPP TSG RAN Meeting #62, RP-132074, Huawei, HiSilicon, Busan, South Korea.

"UMTS Heterogeneous Networks enhancements—Performance," Dec. 3-6, 2013, 4 pages, 3GPP TSG RAN Meeting #62, RP-132074, Huawei, HiSilicon, Busan, South Korea.

Intention to Grant a Patent for European Patent Application No. 14780511.3, dated Feb. 8, 2018, 66 pages.

International Preliminary Report on Patentability for PCT Application No. PCT/EP2014/071235, dated Apr. 13, 2017, 7 pages.

* cited by examiner

METHODS AND NETWORK NODES IN A WIRELESS COMMUNICATION NETWORK FOR HANDLING OF UPLINK SIGNALS SENT BY A USER EQUIPMENT

CROSS-REFERENCE TO RELATED APPLICATIONS

This application is a National stage of International Application No. PCT/EP2014/071235, filed Oct. 3, 2014, which is hereby incorporated by reference.

TECHNICAL FIELD

The present invention relates generally to methods and network nodes in a wireless communication network for handling of uplink signals sent by a user equipment. More specifically, the present invention relates to methods and network nodes for enabling uplink signals sent from a user equipment to reach a serving network node.

BACKGROUND ART

In wireless communication networks built on technologies such as Wideband Code Division Multiple Access, W-CDMA, High Speed Packet Access, HSPA and Enhanced Uplink concept, EUL, soft handover, SHO, also referred to as macro diversity, and fast closed-loop power control are essential features for providing uninterrupted and seamless coverage to user equipments, UEs, travelling across cell borders. FIGS. 1a and 1b illustrate a traditional HSPA deployment scenario with a first and a second base station 101, 102 having a similar transmit power level. Ideally, a UE 110 moving from a serving cell of the first base station 101 towards a non-serving cell of the second base station 102 (the movement illustrated with an arrow in FIG. 1a) would enter a SHO region at border A. At border B where the UE experiences approximately the same reception power for signals received from the first base station as for signals received from the second base station, a serving cell change would occur, such that non-serving cell becomes serving cell and vice versa. Further, at border C the UE 110 would leave the SHO region and only have connection to the second base station 102. It is a radio network controller, controlling the first 101 and the second base station 102 that is in control of reconfigurations, which implies rather long delays for e.g. performing such a cell change. During SHO, the UE is essentially power-controlled by the best uplink base station due to the "DOWN-before-UP" principle, i.e. it is enough that one base station indicates a DOWN command for the UE to lower its power. Since the base stations have roughly the same transmit power, the optimal downlink, DL, and uplink, UL, cell borders will coincide at point B. UL cell border is defined as the place where the path loss from the UE to the first base station will be equal the path loss from the UE to the second base station. Hence, in an ideal setting and from a static (long-term fading) point of view, the serving cell would always correspond to the best uplink. However, in practice, due to imperfections, e.g. reconfiguration delays, and fast fading, the UE might be power controlled solely by the non-serving base station during SHO. In such case there might be problems to receive essential control channel information from the UE in the serving base station due to the weaker link between the serving base station and the UE. For example, a Dedicated Physical Control Channel for High Speed Downlink Shared Channel, HS-DPCCH, and scheduling information need to be received in the serving base station. This problem becomes more pronounced in deployments with significant link imbalances, e.g. heterogeneous networks or multiflow.

Deployment of low-power nodes, LPNs, is seen as a powerful tool to meet the ever-increasing demand for mobile broadband services. A LPN may correspond, for example, to a remote radio unit, RRU, pico base station or micro base station, allowing expanding the network capacity in a cost-efficient way. A LPN is defined as having a lower output power than a high power node, HPN. The HPN may be a macro base station in a system where the LPNs are micro or pico base stations. A network consisting of such HPNs and LPNs is referred to as a heterogeneous network. Two examples of use-cases for heterogeneous network deployment that may be envisioned are coverage holes and capacity enhancement for localized traffic hotspots.

Since the LPNs and the HPNs in a heterogeneous network have different transmit powers, the UL and DL cell borders will normally not coincide. Such an example is shown in FIGS. 2a and 2b where the UE 110 when it is in the region between equal path loss border D and equal downlink received power border E has a smaller path loss to the LPN, while the strongest received power is from the HPN. In such a scenario, the UL is better served by the non-serving LPN 101 while the DL is provided by the serving HPN 102. The region between the equal path loss border D and equal downlink received power (e.g. CPICH receive power) border E is referred to as an imbalance region. Further in FIG. 2b there is a SHO region between borders F and G in which the UE is in soft handover, i.e. connected to both the HPN and the LPN. In the region between E and G, the LPN is the serving node. In the region between E and F, the HPN is the serving node. In the imbalance region some fundamental problems may be encountered. For example, a UE in the region between borders E and F, i.e. in the SHO region but also in the imbalance region, would have the HPN 102 as the serving network node, but in general be power controlled towards the LPN 101. Due to the UL-DL imbalance, the UL towards the serving HPN would be very weak, which means that important control information, such as scheduling information or HS-DPCCH, might not be reliably decoded by the serving HPN. Furthermore, a UE in between borders D and F would have the HPN as the serving network node, and also be power controlled towards the HPN (i.e. not in SHO). Due to the UL-DL imbalance, the UE would cause excessive interference in the LPN node.

A current solution to the imbalance problem is to increase the signal strength in UL enough so that the HPN when it is the serving network node can decode the signal also when the UE is in the imbalance region. This may be performed by either increasing the Signal to Interference Ratio, SIR, target in the LPN or by adding noise in the LPN. However, this causes high interference in the LPN.

Consequently, a severe negative impact on DL and UL scheduling is foreseen due to unreliable reception of UL signals when in such imbalance regions. Also, a more unpredictable/uncontrolled interference characteristic in the network is a direct consequence if nothing is done. All in all, a potentially severe network impact and end-user impact can be envisioned. As shown, there is a need for a solution to handle such imbalance problems.

SUMMARY OF INVENTION

It is an object of the invention to address at least some of the problems and issues outlined above. It is possible to achieve these objects and others by using a method and an apparatus as defined in the attached independent claims.

According to a first aspect, a method is provided performed by a first network node of a wireless communication network for handling uplink signals sent by a UE. The wireless communication network comprises a serving network node responsible for transmitting downlink signals to the UE, and a non-serving network node capable of receiving uplink signals sent by the UE. The non-serving network node is the first network node and the serving network node is a second network node of the communication network, or the non-serving network node is the second network node and the serving network node is the first network node. The method comprises receiving an uplink signal from the UE, the signal comprising information representing a dedicated physical channel dedicated for the UE, and measuring signal quality on the received uplink signal. The method further comprises receiving signal quality information from the second network node regarding signal quality measured by the second network node on the uplink signal received by the second network node, thus enabling detection in the first network node of imbalances in experienced signal quality between the first network node and the second network node.

According to another aspect, a first network node of a wireless communication network is provided, configured for handling uplink signals sent by a UE. The wireless communication network comprises a serving network node responsible for transmitting downlink signals to the UE, and a non-serving network node capable of receiving uplink signals sent by the UE. The non-serving network node is the first network node and the serving network node is a second network node, or the non-serving network node is the second network node and the serving network node is the first network node. The first network node comprising a processor and a memory. Said memory contains instructions executable by said processor, whereby the first network node is operative for receiving an uplink signal from the UE, the signal comprising information representing a dedicated physical channel dedicated for the UE, and measuring signal quality on the received uplink signal. Said memory further contains instructions executable by said processor, whereby the first network node is operative for receiving signal quality information from the second network node regarding signal quality measured by the second network node on the uplink signal received by the second network node, thus enabling detection in the first network node of imbalances in experienced signal quality between the first network node and the second network node.

According to other aspects, computer programs and carriers for computer programs are also provided, the details of which will be described in the claims and the detailed description.

The above method and apparatus may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 1b is a schematic side view of the wireless communication network of FIG. 1a.

FIG. 2b is a schematic side view of the wireless communication network of FIG. 2a.

DESCRIPTION OF EMBODIMENTS

Figure 1A:
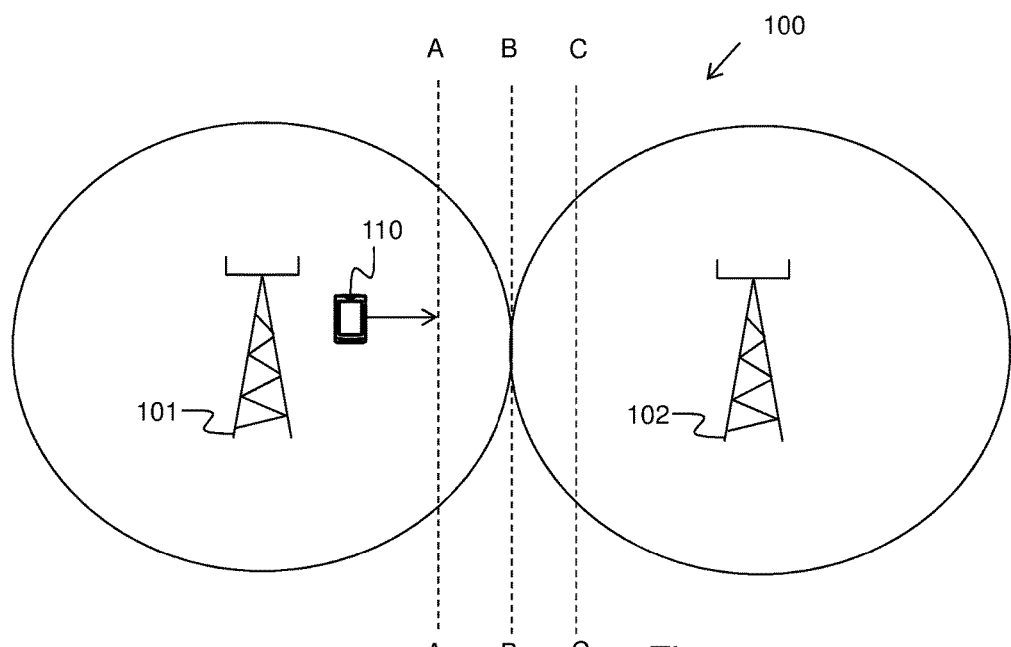
FIG. 1a is a schematic view from above of a part of a wireless communication network in which the present invention may be used.
Figure 1B:
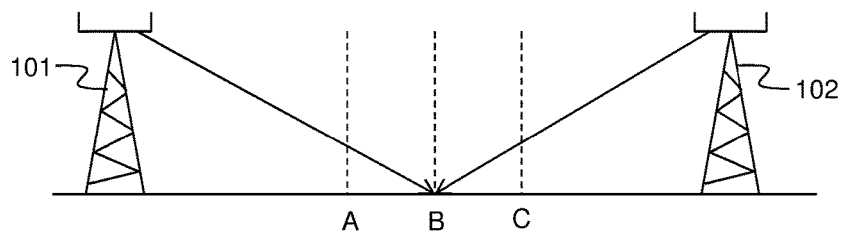
Figure 2A:
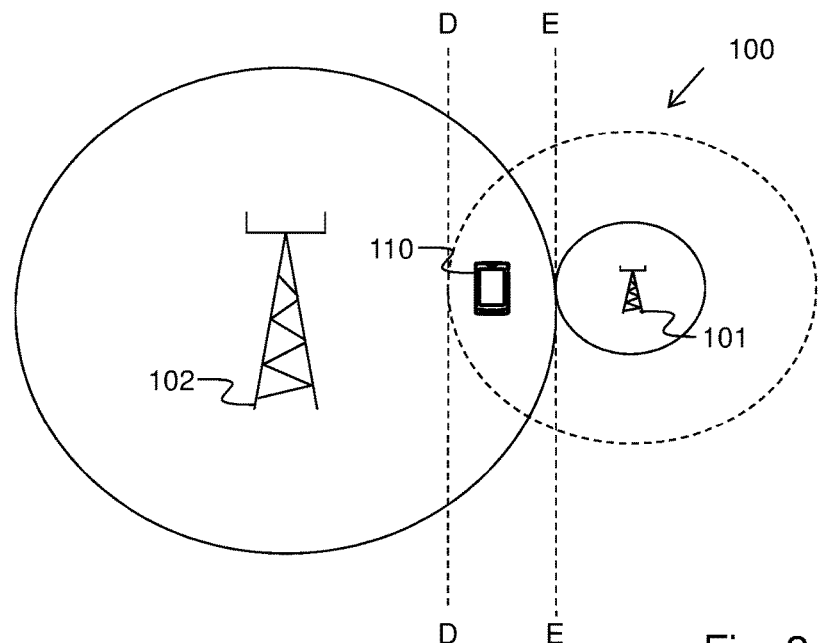
FIG. 2a is a schematic view from above of a part of a wireless heterogeneous communication network in which the present invention may be used.
Figure 2B:
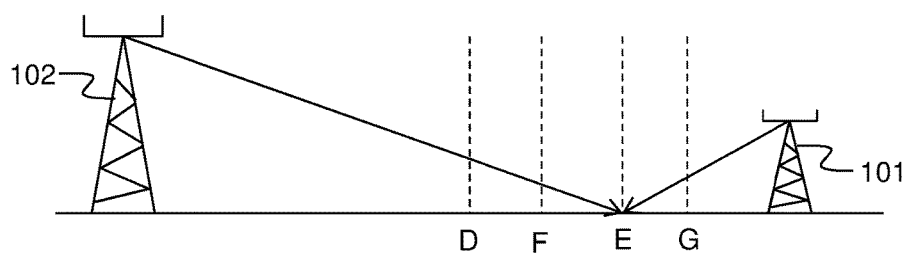

Briefly described, at least an embodiment of the invention deals with measuring uplink signal quality, e.g. SIR by a serving network node and by a non-serving network node on an uplink signal sent by a certain UE. The measured signal qualities are then communicated between the serving network node and the non-serving network node to help in solving imbalance problems between the non-serving and the serving network nodes. When at least one of the serving and the non-serving network nodes have knowledge about the signal quality experienced at both nodes, this node also automatically has knowledge about a possible imbalance in uplink signal quality between the nodes for uplink signals sent from the certain UE, and how big this signal quality imbalance is, measured in e.g. SIR difference. The node having knowledge of the SIR difference may use this knowledge to e.g. increase its SIR target. Thereby, the UE will increase the signal strength on its uplink signals, which results in an increased signal quality at both the serving and the non-serving network node. This is advantageous when e.g. signals received at the serving network node have a too low SIR but are well received at the non-serving network node and therefore power controlled by the non-serving network node. In other words, by communicating measured signal quality on the same UE uplink signal between a non-serving and a serving network node, the one of the serving and the non-serving network node that has access to both measurements will automatically know the imbalance in signal quality between the non-serving and the serving network node, e.g. as a SIR difference, and can take actions to facilitate reception of the UE uplink signal in both the non-serving and the serving network node. The methods and the network nodes described are advantageously used in W-CDMA/HSPA networks.

A number of solution candidates to the imbalance problem is currently discussed. A problem with the solution candidates is that differences between the downlink Common Pilot Channel, CPICH, powers of the serving network node and non-serving network node is used to indicate how much uplink imbalance there is. In other words, the assumption is that if the downlink CPICH power of the nodes is equal, then it is considered there is no imbalance, i.e. the best uplink region and the best downlink region coincide, and when the DL CPICH power between the nodes is different, then there is an uplink downlink imbalance corresponding to the amount of difference. This is a useful way to understand that there is imbalance, but it is not a good indication of how much uplink imbalance there actually is since it is based on a downlink measure, and so does not take into account the effect of uplink factors on how well the uplink signal is received in each network node. Uplink factors that can affect how well the uplink signal is received in a network node comprises: Uplink load and interference in the different cells, which can be very different from each other; Fading and radio channel effects; Properties of the uplink receivers in the different network nodes, for example: Different receiver sensitivities in the serving and non-serving network node; Different types of receiver in the serving and non-serving network node e.g. RAKE receivers or advanced interference suppression receivers and amounts of "de-sensitization" that may have been applied in the non-serving network node.

In short, it has been shown above that uplink imbalance should be measured using uplink measures. As mentioned above, a useful uplink measure giving an indication of the quality of an uplink radio link is the uplink SIR of e.g. an uplink Dedicated Physical Control Channel, DPCCH. In current WCDMA/HSPA systems, each node B only knows the Uplink SIR of its own radio links, and it does not know the uplink SIR of the radio links in the other Node B when in soft handover. On the other hand, when the uplink imbalance amount is made known in at least one of a serving and non-serving Node B, as in this invention, actions can be taken to improve performance, actions which will be further described below.

An embodiment of the inventive solution comprises: forwarding uplink DPCCH SIR and/or SIR related information between node Bs, via an Iubx interface or via existing Iub interfaces via RNC; using the forwarded information to calculate a continuous measure of the amount of uplink imbalance for radio links in soft handover for each user, and, in a variant of this embodiment, using the calculated imbalance measure between a serving node B and a non-serving node B to adapt the uplink power control by the right amount to allow the decoding of essential L1/L2 control information in the serving node B.

Figure 3:
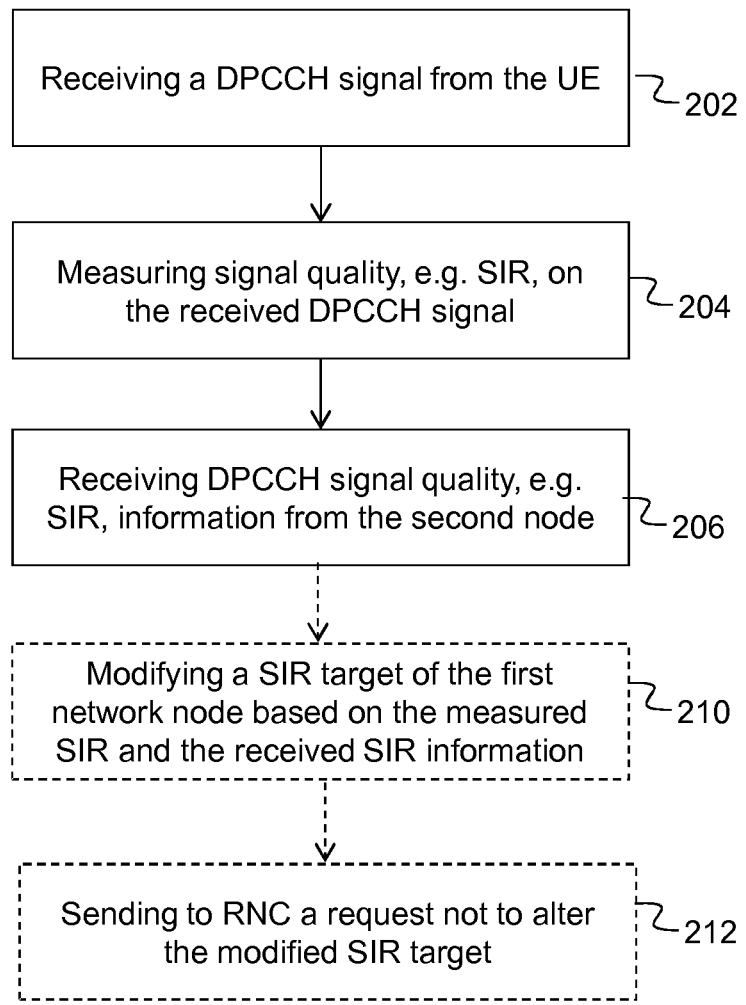
FIG. 3 is a flow chart of an embodiment of the invention.

FIG. 3 describes an embodiment of a method performed by a first network node of a wireless communication network 100 for handling uplink signals sent by a user equipment, UE, 110 wherein the wireless communication network comprises a serving network node 102 responsible for transmitting downlink signals to the UE 110, and a non-serving network node 101 capable of receiving uplink signals sent by the UE 110, wherein the non-serving network node is the first network node and the serving network node is a second network node of the communication network, or the non-serving network node is the second network node and the serving network node is the first network node. The method comprises: receiving 202 an uplink signal from the UE, the signal comprising information representing a dedicated physical channel dedicated for the UE, and measuring 204 signal quality on the received uplink signal. The method further comprises receiving 206 signal quality information from the second network node regarding signal quality measured by the second network node on the uplink signal received by the second network node, thus enabling detection in the first network node of imbalances in experienced signal quality between the first network node and the second network node.

A network node may be a physically separate base station, e.g. a node B, but also a logical node working either as a non-serving network node or a serving network node. For example, a physical base station may comprise both a serving node and a non-serving node. This may be the case when the physical base station serves many sector cells, and wherein one part of the physical base station serving a first sector cell would work as a serving network node for a UE and another part of the physical base station serving a second sector cell works as a non-serving network node for the same UE. A serving network node serves a UE with connection to the wireless network. In particular, the serving network node is in control of the connection of the UE to the network, e.g. it schedules the UE in downlink. In a similar manner, a non-serving network node may also provide the UE with connection to the network, e.g. in soft handover, but in contrast to the serving network node, the non-serving network node is not in control of the connection of the UE to the network. The dedicated physical channel may be a DPCH (Dedicated Physical Channel), a dedicated physical control channel, e.g. DPCCH (Dedicated Physical Control Channel), Enhanced DPCCH (E-DPCCH), or a DPCCH for High Speed Downlink Shared Channel (HS-DPCCH). The method is performed by a first network node. The first network node may either be the serving network node or the non-serving network node. When the method is performed by the serving network node, the non-serving network node is the second network node that sends signal quality information to the serving network node. When the method is performed by the non-serving network node, the serving network node is the second network node that sends signal quality information to the non-serving network node.

When the first network node has information of both own measured signal quality and signal quality measured at the second network node, it is possible for the first network node to detect and quantify amount of imbalances in received signal quality between the first and the second network node. The first network node may use such information to modify its signal quality target such that the signal comprising the dedicated physical channel is well received in the second network node as well as in the first network node. In the alternative that the first network node is the non-serving network node and the second network node is the serving network node, and the signal quality is higher at the non-serving network node than at the serving network node, which may occur in heterogeneous networks, the non-serving network node may raise its uplink signal quality target such that the serving network node receives the signal comprising the dedicated physical channel well. For example, the non-serving network node may raise its signal quality target to a level similar to the signal quality difference, or the non-serving network node may raise its signal quality target to a level such that the signal quality level at the serving network node can reach its signal quality target. As a result of uplink power control, the UE will then raise its transmitted power level so that the serving network node experiences the requested signal quality. As a result, the DPCCH signal can be well received at the serving network node.

According to an embodiment, the measured signal quality is signal to interference ratio, SIR, and the received signal quality information is received SIR information. Another example of a possible signal quality measure is signal to noise ratio, SNR. Any signal quality measure may be used. However, the signal quality measure used for the measured signal quality and the signal quality measure used for the received signal quality information have to be comparable. According to an embodiment, the method further comprises modifying 210 an uplink SIR target of the first network node based on the measured 204 first network node SIR and the received 206 second network node SIR information. By modifying the SIR target in the first network node based on the measured SIR and the SIR information received from the second network node, the SIR experienced in the second network node is modified to reach a certain required level, such as a SIR target level of the second network node. In the case when the measured SIR and the SIR information reveals that the SIR at the second network node is too low, the first network node may, according to an embodiment, raise its uplink SIR target to a level similar to the imbalance difference. As a result of uplink power control, the UE will then raise its transmitted power level to reach the modified SIR target at the first network node. The second network node will then experience a higher SIR. The experienced higher SIR may then be enough for the second network node to get a good reception of the dedicated control channel signal. This is especially advantageous when the first network node is the non-serving network node and the second network node is the serving network node.

According to another embodiment, the method further comprises sending 212 a request to a radio network controller, RNC, to which the first network node is connected, the request requesting the RNC not to alter the modified 210 SIR target value of the first network node. By sending such a request it can be prevented that the RNC modifies the already modified SIR target due to the BLER becoming lower than required. If the RNC would have re-modified the SIR target at the first node, the second node may experience a bad signal quality again. The sent request may be a SIR target freeze request, i.e. a request to the RNC to freeze the SIR target at the modified SIR target level.

According to an embodiment, the received 206 signal quality information is a signal quality value measured at the second network node. The first network node may then use the signal quality value measured at the first network node and the signal quality value measured at the second network node to calculate a difference that may represent the uplink imbalance between the first network node and the second network node. The signal quality target value of the first network node target will then be modified, and as a result, the UE will send DPCH signals with a modified signal strength such that the signal quality values measured at the first network node and the second network node will change.

According to an embodiment, the received 206 signal quality information is a value of a difference between a signal quality target of the second network node and a signal quality measured by the second network node. By the first network node knowing the difference between the signal quality target value and the experienced signal quality at the second network node, the first network node may infer the signal quality value in the second network node and modify its own signal quality target so that the signal quality experienced in the second network node reaches a certain quality level, such as the second network node signal quality target value. For example, in the case the signal quality measured at the second network node is lower than the signal quality target value of the second node, the first network node may raise its signal quality target value so that the difference between the signal quality target value of the second network node and the measured signal quality is lowered, and if necessary, by further modification of the first network node signal quality target until the signal quality of the second network node reaches its signal quality target value.

According to an embodiment, the wireless communication network 100 is a heterogeneous network, the serving network node 102 is a high power node and the non-serving network node 101 is a low power node transmitting wireless signals with a lower power than the high power node.

In the described embodiments, the UE 110 may be in a soft handover condition when it is in communication with both the serving network node 102 and the non-serving network node 101.

According to another embodiment, the signal quality information received 206 from the second network node comprises at least some of the following information: second network node identifier, UE identifier, measured dedicated physical channel signal quality or difference between measured dedicated physical channel signal quality and target dedicated physical channel signal quality at the second network node, and information whether the second network node is the serving network node or the non-serving network node for the UE.

Figure 4:
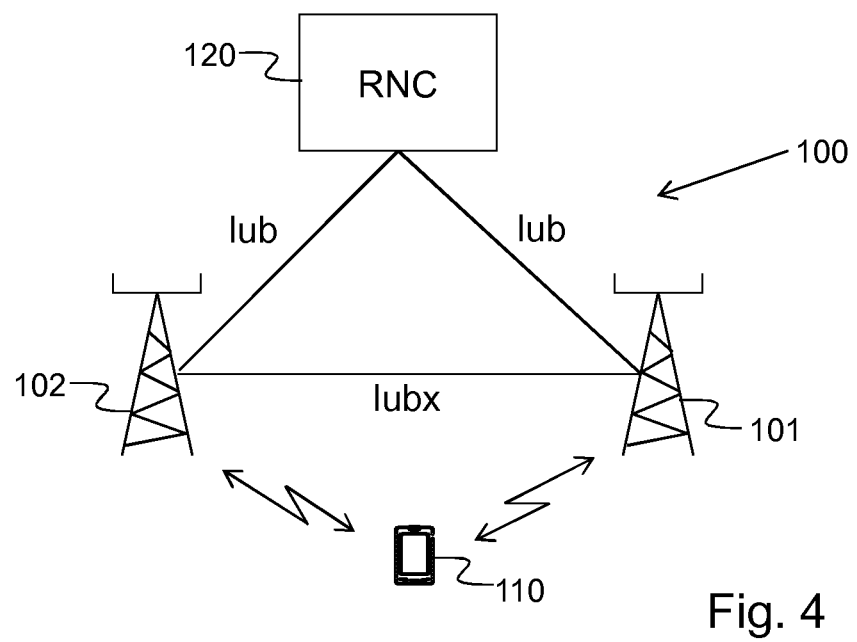
FIG. 4 is a schematic block diagram of a wireless communication network.

The information of measured signal quality, e.g. SIR to be communicated from the second network node to the first network node may be communicated over different interfaces, examples of which are shown in FIG. 4. According to a first embodiment, the information may be communicated over the Iub interface between each of the network nodes 101, 102 and the RNC 120, for example using proprietary signaling over NBAP at radio link, RL, Setup, RL Addition and RL Reconfiguration, or even more suitable over the Frame Protocol or other suitable protocol over which it is possible to communicate at any time. Alternatively, the information may be communicated over new or modified Iub information elements that may be added to the standard. According to a second embodiment, the information of the measured SIR may be forwarded over a link between the serving cell and the non-serving cell(s). The link can be direct via a proprietary interface, or even a standardized interface, e.g. Iubx.

Information to be forwarded between Node Bs. All of the following information elements can be signaled proprietary or over new or modified 3GPP NBAP/Iub Frame Protocols or over a direct radio base station to radio base station link via IP. The direction of the forwarded information can either be from non-serving Node B to serving Node B or vice versa. Information elements to be forwarded comprises: Identifier of the transmitter, e.g. UE-ID, radio base station ID, cell ID; Node type, e.g. pico base station, micro base station, etc.; DPCCH SIR or Filtered SIR measurement; DPCCH SIR error, i.e. delta or filtered delta between SIR and SIR target; Serving radio link information (to identify that this is a serving Node B), and Non-serving radio link Information (to identify that this is a non-serving Node B). The information can be signaled at different rates depending on the capacity of the link between the different Node Bs. Faster links, e.g. tens of ms, with more continuous measurements will allow more regular signaling of the above information and so a more accurate measurement of the uplink imbalance. However even with slower links, of the order of some hundred ms, then the measure of imbalance is expected to be useful.

Calculation of uplink imbalance. According to an embodiment, each (or at least one) network node receives for a UE in soft handover a set of measured SIR for each other link in soft handover, and for its own link. A link in soft handover is a connection between the UE and a network node, either serving or non-serving, which is in communication with the UE. The uplink imbalance can be calculated as the offset between the measured DPCCH SIR for each radio link for a given user i between the link to network node A and the link to network node B, and is measured in network node A as:

$$\text{UL Imbalance offset} = \text{SIR}i\,A - \text{SIR}i\,B,$$

where SIRi A is the DPCCH received in the Radio link for user i in network node A and where SIRi B is the DPCCH received in the Radio link for user i in network node B. Note that this can also apply to softer handover, i.e. SIRi A could be the SIR received on an RLS in Node A with more than one cell where those cells are in Softer Handover.

As an example, we say that for a given UE in soft handover between a serving HPN and a non-serving LPN, the measured SIR in the LPN is 6 dB, and the measured SIR in the HPN is 1 dB. Then the value of 1 dB is sent from the HPN to the LPN. Then in the LPN the imbalance is calculated as uplink Imbalance offset=6 dB−1 dB=5 dB, while in the HPN the UL imbalance offset is calculated as uplink Imbalance offset=1 dB−6 dB=−5 dB.

In the above example it is known in the LPN that the received SIR is lower by 5 dB in the HPN. If the HPN target is the same as the LPN target, which is a normal case, in this example 6 dB, it can be inferred in the LPN that the SIR needs to be raised by 5 dB to meet the SIR target in the HPN. According to this embodiment, the idea is that the LPN can help the HPN to reach its SIR target by raising its own SIR target by 5 dB.

If we assume that in this example the LPN was meeting its SIR target of 6 dB, then one solution is to set a higher target in the LPN, in this example 6+5=11 dB. The UE will then raise it's transmit power due to inner loop power control from the LPN to meet this new SIR target. This will cause a raised SIR also in the HPN. The SIR then increases to meet the HPN SIR target of 6 dB, securing the Uplink control channels such as HS-DPCCH in the HPN.

Alternatively, when the received SIR information is a value of the difference between the SIR target of the HPN and the SIR measured by the HPN, the LPN knows how far the SIR is from the SIR target in the HPN. The LPN will then raise it's SIR target to overcome the difference between measured SIR and SIR target in the HPN. For example, if the measured SIR in the HPN is 1 dB and the SIR target in the HPN is 4 dB, the LPN receives the difference value of 3 dB and raises it's SIR target with 3 dB. As a result of inner loop power control the UE will raise its transmission power so that the experienced SIR in the LPN becomes 7 dB and so that the experienced SIR in the HPN becomes approximately 4 dB. The LPN may either receive the difference value or both values (SIR target and experienced SIR at the HPN). In the latter case the LPN calculates the difference from the two received values. To receive information indicative of the difference between SIR target and experienced SIR is in general a more powerful method than to receive information of only the measured SIR at the HPN, since by definition, the SIR is Signal to Interference ratio (C/I) and the interference is not necessarily the same in the HPN as in the LPN. It can also be possible that the SIR measurement is calculated differently between the HPN and LPN, for example if they are from different vendors, use different interference cancellation techniques, have different number of receive antennas etc. In other words, it is not necessarily true that 1 dB raise in SIR target in the LPN means that the measured SIR will raise exactly 1 dB in the LPN, unless the interference and also the calculation is the same in both nodes. Therefore, in at least some realizations, it may be important that the LPN gets continuous updates of the measured difference between SIR and SIR target of the HPN. Then we have a control loop, and can continually adjust the SIR target by different amounts in the LPN to be able to close the gap between the measured SIR and the SIR target in the HPN. Then, to avoid fluctuations where we raise or lower the SIR target too much in the LPN, it is also possible to filter the measured difference between the SIR and the SIR target of the HPN, so that we only adjust when the gap of the filtered values is large enough for long enough.

Alternatively, the LPN may increase it's SIR target by a difference between the measured HPN SIR, and a pre-defined SIR target that is set for decoding HS-DPCCH. The pre-defined SIR target may not be exactly the same as the RNC set HPN SIR target.

A consequence of a higher SIR target in the LPN is that the Block Error Ratio, BLER, will decrease. This could cause an Outer loop power control, OLPC, in the RNC to reduce the newly increased SIR target in the LPN, and as a consequence also in the HPN, since the OLPC in the standard implementation sends the same SIR target to all radio base stations, if the received BLER is lower than a BLER target. However, the SIR target in the LPN (and HPN) should not be reduced again since inner loop power control in the LPN would then cause a too low SIR again for the HPN to be able to decode the control channels in the uplink. One way to solve this is to have a minimum SIR target for the OLPC, which protects the quality of the control channels. Another alternative is that the LPN sends a SIR target freeze requests to the RNC, to prevent that the SIR target is decreased by the OLPC, when the LPN is aware that the SIR target in the HPN is already low enough. The LPN can know this in the alternatives when it can calculate the SIR target in the Macro from the information received.

Note that there can be multiple network nodes in soft handover. The calculation above will overcome the imbalance between any two radio links, linking individual network nodes to the same UE, so that there is enough power applied to each radio link to meet the required SIR at the network node, e.g. the required SIR for the control channels.

According to another embodiment, the HPN can calculate the imbalance as in the example above. This gives the HPN an idea of how much interference will be raised in the LPN to overcome the imbalance, using any of the embodiments described above. The HPN can use this information to reduce the effect on the LPN if necessary, for example to reduce the Uplink grant.

Note that the described embodiments are not limited to be used in heterogeneous networks unless so explicitly stated. The individual embodiments may also be used in e.g. HPN to HPN, or LPN to LPN, i.e. in any situation where there is some uplink imbalance.

According to an embodiment, The DPCCH SIR measurements are done repeatedly over time, for example continuously, for each radio link.

Figure 5:
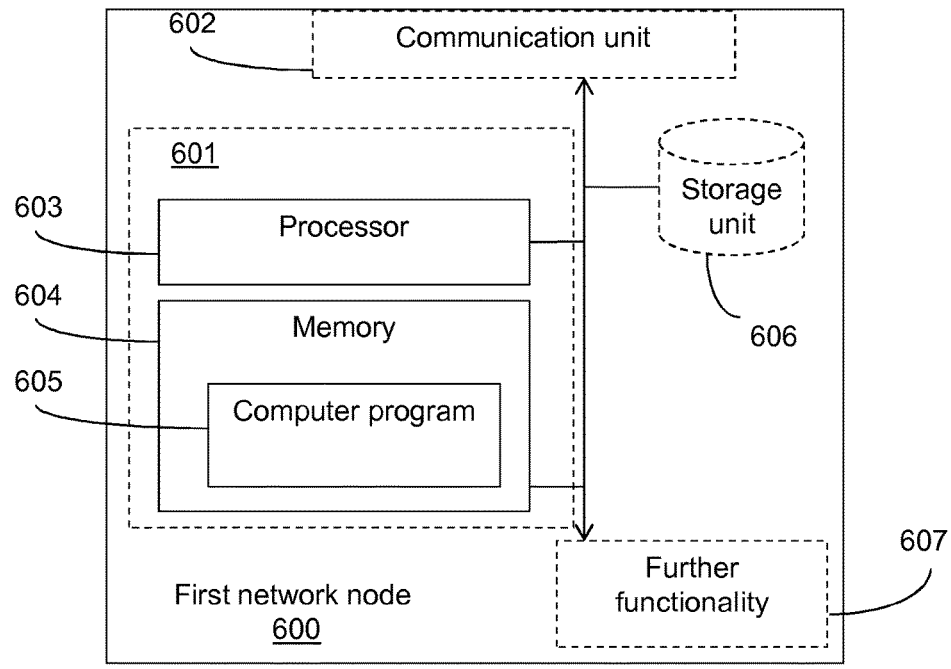
FIGS. 5-6 are schematic block diagrams of different embodiments of the invention.

FIG. 5 describes an embodiment of a first network node 600 of a wireless communication network, configured for handling uplink signals sent by a UE, wherein the wireless communication network comprises a serving network node responsible for transmitting downlink signals to the UE, and a non-serving network node capable of receiving uplink signals sent by the UE. In a first alternative the non-serving network node is the first network node and the serving network node is a second network node, in a second alternative the non-serving network node is the second network node and the serving network node is the first network node. The first network node 600 comprises a processor 603 and a memory 604. The memory contains instructions executable by said processor, whereby the first network node 600 is operative for receiving an uplink signal from the UE, the signal comprising information representing a dedicated physical channel dedicated for the UE; and measuring signal quality on the received uplink signal. The memory further contains instructions executable by said processor, whereby the first network node 600 is operative for receiving signal quality information from the second network node regarding signal quality measured by the second network node on the uplink signal received by the second network node, thus enabling detection in the first network node of imbalances in experienced signal quality between the first network node and the second network node.

According to an embodiment, the measured signal quality is signal to interference ratio, SIR, and the received signal quality information is received SIR information.

According to another embodiment, the memory 604 further contains instructions executable by said processor, whereby the first network node 600 is operative for modifying an uplink SIR target of the first network node based on the measured first network node SIR and the received second network node SIR information.

According to another embodiment, the memory 604 further contains instructions executable by said processor, whereby the first network node 600 is operative for sending a request to a radio network controller, RNC, to which the first network node is connected, the request requesting the RNC not to alter the modified SIR target value of the first network node.

According to another embodiment, the received signal quality information is a signal quality value measured at the second network node.

According to another embodiment, the received signal quality information is a value of a difference between a signal quality target of the second network node and a signal quality measured by the second network node.

According to another embodiment, the wireless communication network 100 is a heterogeneous network, the serving network node 102 is a high power node and the non-serving network node 101 is a low power node transmitting wireless signals with a lower power than the high power node.

According to another embodiment, the signal quality information received from the second network node comprises at least some of the following information: second network node identifier, UE identifier, measured dedicated physical channel signal quality or difference between measured dedicated physical channel signal quality and target dedicated physical channel signal quality at the second network node, and information whether the second network node is the serving network node or the non-serving network node for the UE.

The first network node may further comprise a communication unit 602, which may be considered to comprise conventional means for communicating from and/or to the other nodes in the network, such as the UE, the second network node and the RNC. The conventional communication means may include at least one transmitter and at least one receiver. The first network node may further comprise one or more storage units 606 and further functionality 607 useful for first network node to serve its purpose as network node, e.g. as a base station. The instructions executable by said processor may be arranged as a computer program 605 stored in said memory 604. The processor 603 and the memory 604 may be arranged in an arrangement 601. The arrangement 601 may be a micro processor and adequate software and storage therefore, a Programmable Logic Device, PLD, or other electronic component(s)/processing circuit(s) configured to perform the actions, or methods mentioned above.

The computer program 605 may comprise computer readable code means, which when run in the first network node 600 causes the first network node to perform the steps described in any of the described embodiments. The computer program may be carried by a computer program product connectable to the processor. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the system of network nodes has access via its communication unit 602. The computer program may then be downloaded from the server into the memory 604.

Figure 6:
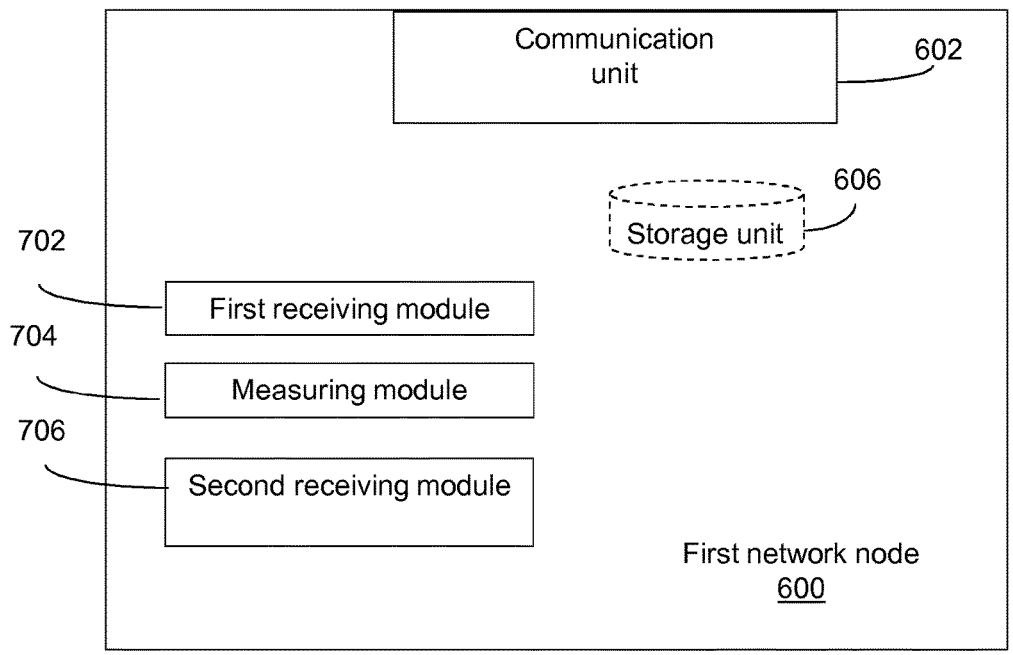

FIG. 6 (in combination with FIG. 4) describes another embodiment of a first network node 600 of a wireless communication network 100, configured for handling uplink signals sent by a UE 110, wherein the wireless communication network comprises a serving network node 102 responsible for transmitting downlink signals to the UE 110, and a non-serving network node 101 capable of receiving uplink signals sent by the UE 110. In a first alternative the non-serving network node 101 is the first network node and the serving network node 102 is a second network node. In a second alternative the non-serving network node is the second network node and the serving network node is the first network node. The first network node 600 comprises a first receiving module 702 for receiving an uplink signal from the UE, the signal comprising information representing a dedicated physical channel dedicated for the UE; and a measuring module 704 for measuring signal quality on the received uplink signal. The first network node 600 further comprises a second receiving module 706 for receiving signal quality information from the second network node regarding signal quality measured by the second network node on the uplink signal received by the second network node, thus enabling detection in the first network node of imbalances in experienced signal quality between the first network node and the second network node.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a first network node of a wireless communication network for handling uplink signals sent by a user equipment (UE) wherein the wireless communication network comprises a serving network node responsible for transmitting downlink signals to the UE, and a non-serving network node capable of receiving uplink signals sent by the UE, wherein the non-serving network node is the first network node and the serving network node is a second network node of the communication network, or the non-serving network node is the second network node and the serving network node is the first network node, the method comprising:

receiving an uplink signal from the UE, the signal comprising information representing a dedicated physical channel dedicated for the UE;
measuring signal quality on the received uplink signal;
receiving signal quality information from the second network node regarding signal quality measured by the second network node on the uplink signal received by the second network node, thus enabling detection in the first network node of imbalances in experienced signal quality between the first network node and the second network node,
wherein during a handover of the UE from the serving network node to the non-serving network node, the first network node, when operating as the serving network node, adjusts its signal quality target to ensure reception of the uplink signal at the second network node and, when operating as the non-serving network node, has the UE adjust its uplink signal to ensure reception of the uplink signal at the second network node.

2. The method according to claim 1, wherein the measured signal quality is signal to interference ratio (SIR) and the received signal quality information is received SIR information.

3. The method according to claim 2, further comprising:
modifying an uplink SIR target of the first network node based on the measured first network node SIR and the received second network node SIR information.

4. The method according to claim 3, further comprising:
sending a request to a radio network controller (RNC) to which the first network node is connected, the request requesting the RNC not to alter the modified SIR target of the first network node.

5. The method according to claim 1, wherein the received signal quality information is a signal quality value measured at the second network node.

6. The method according to claim 1, wherein the received signal quality information is a value of a difference between a signal quality target of the second network node and a signal quality measured by the second network node.

7. The method according to claim 1, wherein the wireless communication network is a heterogeneous network, the serving network node is a high power node and the non-serving network node is a low power node transmitting wireless signals with a lower power than the high power node.

8. The method according to claim 1, wherein the signal quality information received from the second network node comprises at least some of the following information: the second network node identifier, the UE identifier, the measured dedicated physical channel signal quality or difference between the measured dedicated physical channel signal quality and target dedicated physical channel signal quality at the second network node, and information whether the second network node is the serving network node or the non-serving network node for the UE.

9. A first network node of a wireless communication network, configured for handling uplink signals sent by a user equipment (UE) wherein the wireless communication network comprises a serving network node responsible for transmitting downlink signals to the UE, and a non-serving network node capable of receiving uplink signals sent by the UE, wherein the non-serving network node is the first network node and the serving network node is a second network node, or the non-serving network node is the second network node and the serving network node is the first network node, the first network node comprising:
a processor; and
a memory coupled to the processor, said memory containing instructions, which when executed by said processor, cause the first network node to:
receive an uplink signal from the UE, the signal comprising information representing a dedicated physical channel dedicated for the UE;
measure signal quality on the received uplink signal; and
receive signal quality information from the second network node regarding signal quality measured by the second network node on the uplink signal received by the second network node, thus enabling detection in the first network node of imbalances in experienced signal quality between the first network node and the second network node,
wherein during a handover of the UE from the serving network node to the non-serving network node, the first network node, when operating as the serving network node, adjusts its signal quality target to ensure reception of the uplink signal at the second network node and, when operating as the non-serving network node, has the UE adjust its uplink signal to ensure reception of the uplink signal at the second network node.

10. The first network node according to claim 9, wherein the measured signal quality is signal to interference ratio (SIR) and the received signal quality information is received SIR information.

11. The first network node according to claim 10, wherein said memory further contains instructions, which when executed by said processor, cause the first network node to modify an uplink SIR target of the first network node based on the measured first network node SIR and the received second network node SIR information.

12. The first network node according to claim 11, wherein said memory further contains instructions, which when executed by said processor, cause the first network node to send a request to a radio network controller (RNC) to which the first network node is connected, the request requesting the RNC not to alter the modified SIR target of the first network node.

13. The first network node according to claim 9, wherein the received signal quality information is a signal quality value measured at the second network node.

14. The first network node according to claim 9, wherein the received signal quality information is a value of a difference between a signal quality target of the second network node and a signal quality measured by the second network node.

15. The first network node according to claim 9, wherein the wireless communication network is a heterogeneous network, the serving network node is a high power node and the non-serving network node is a low power node transmitting wireless signals with a lower power than the high power node.

16. The first network node according to claim 9, wherein the signal quality information received from the second network node comprises at least some of the following information: the second network node identifier, the UE identifier, the measured dedicated physical channel signal quality or difference between the measured dedicated physical channel signal quality and target dedicated physical channel signal quality at the second network node, and information whether the second network node is the serving network node or the non-serving network node for the UE.

17. A non-transitory computer readable storage medium having computer code stored therein, which when run on a processor in a first network node operable in a wireless communication network, cause the first network node to perform operations comprising:

receiving an uplink signal from a user equipment (UE), the signal comprising a dedicated physical channel (DPCH) dedicated for the UE;

measuring signal quality, on the received uplink signal; and receiving signal quality information from a second network node regarding signal quality measured by the second network node on the uplink signal received by the second network node, thus enabling detection of imbalances in received signal quality between the first network node and the second network node, wherein the first network node is a non-serving network node and the second network node is a serving network node, or the second network node is the non-serving network node and the first network node is the serving network node, and wherein during a handover of the UE from the serving network node to the non-serving network node, the first network node, when operating as the serving network node, adjusts its signal quality target to ensure reception of the uplink signal at the second network node and, when operating as the non-serving network node, has the UE adjust its uplink signal to ensure reception of the uplink signal at the second network node.

18. The non-transitory computer readable storage medium according to claim 17, wherein the computer code when run on the processor, perform measurement operations where the measured signal quality is signal to interference ratio (SIR) and the received signal quality information is received SIR information.

19. The non-transitory computer readable storage medium according to claim 18, wherein the computer code when run on the processor, performs further operations comprising:

modifying an uplink SIR target of the first network node based on the measured first network node SIR and the received second network node SIR information.

20. The non-transitory computer readable storage medium according to claim 19, wherein the computer code when run on the processor, performs further operations comprising:

sending a request to a radio network controller (RNC) to which the first network node is connected, the request requesting the RNC not to alter the modified SIR target of the first network node.

\* \* \* \* \*